United States Patent
Theising et al.

[11] Patent Number: 5,884,544
[45] Date of Patent: Mar. 23, 1999

[54] SCROLL SAW VACUUM ATTACHMENT ASSEMBLY

[75] Inventors: John L. Theising, St. Peters, Mo.; Larry D. Hale, Granite City, Ill.

[73] Assignee: Emerson Electric Co., St. Louis, Mo.

[21] Appl. No.: 972,419

[22] Filed: Nov. 18, 1997

[51] Int. Cl.⁶ .................................................. B27B 11/02
[52] U.S. Cl. .................................. 83/100; 83/786; 83/662
[58] Field of Search ........................... 83/100, 783, 784, 83/785, 786, 662

[56] References Cited

U.S. PATENT DOCUMENTS

| | | | |
|---|---|---|---|
| 3,135,151 | 6/1964 | Link et al. | 83/168 |
| 3,214,869 | 11/1965 | Stryker | 51/273 |
| 3,322,169 | 5/1967 | Hilliard | 143/6 |
| 3,387,429 | 6/1968 | Peabody | 53/228 |
| 3,942,411 | 3/1976 | Gerber | 90/11 |
| 4,090,297 | 5/1978 | Wanner | 30/124 |
| 4,200,417 | 4/1980 | Hager et al. | 408/67 |
| 4,241,505 | 12/1980 | Bodycomb, Jr. et al. | 30/390 |
| 4,367,665 | 1/1983 | Terpstra et al. | 83/100 |
| 4,414,743 | 11/1983 | Pioch et al. | 83/100 X |
| 4,576,072 | 3/1986 | Terpstra et al. | 83/100 X |
| 4,674,381 | 6/1987 | Cadorin | 83/752 |
| 4,721,023 | 1/1988 | Bartlett et al. | 83/100 |
| 5,065,652 | 11/1991 | Legler et al. | 83/168 |
| 5,069,695 | 12/1991 | Austin | 55/385.1 |
| 5,235,890 | 8/1993 | Mathre | 83/169 |
| 5,445,056 | 8/1995 | Folci | 83/100 |
| 5,662,017 | 9/1997 | Mellon | 83/169 |

*Primary Examiner*—M. Rachuba
*Assistant Examiner*—T. Anthony Vaughn
*Attorney, Agent, or Firm*—Arnold, White & Durkee

[57] ABSTRACT

A vacuum attachment assembly for a scroll saw wherein the scroll saw includes a base, a table, a table bevel lock knob, a table bevel plate, an upper arm and a lower arm-blade. The vacuum attachment includes a bracket having first and second ends. The first end of the bracket has an opening for receiving the table bevel lock knob. The second end of the bracket has an opening of predetermined size and is oriented so that the opening is located under the scroll saw table near the lower arm-blade assembly. The vacuum attachment assembly also includes an elbow that is connected to the opening of the second end of the bracket. A hose is connected to the elbow and oriented to collect and divert saw dust away from the table of the scroll saw.

12 Claims, 5 Drawing Sheets

SCROLL SAW VACUUM ATTACHMENT ASSEMBLY

BACKGROUND OF THE INVENTION

The present invention relates to an improved vacuum attachment assembly for collecting dust from power tools during operation. The present invention is particularly suitable for collecting and diverting the dust away from underneath a scroll saw.

Scroll saws are wood-cutting power tools. The present invention relates particularly to table-top scroll saws which typically include a table, a base, an upper arm assembly, a lower arm assembly and a blade connected between the two assemblies. The blade of a scroll saw is small to facilitate the cutting of intricate and ornamental shapes in a wood piece. The cutting action of blade results from a reciprocating up and down motion of the blade caused by the upper and lower arm assemblies.

During the operation of the scroll saw, sawdust falls through the opening in the table and accumulates under the unit. Frequent cleaning under the tool is necessary to assure proper motor ventilation, and to prevent the drive linkage from binding. Because scroll saws are typically mounted to a workbench, the operator is required to remove fasteners in order to clean under the unit. Thus, a sawdust collection system mounted underneath the scroll saw is useful to prevent sawdust buildup.

Many prior art scroll saws have dust collection systems. However, many of these are designed integral with the base of the unit. There is a need in the art for a portable vacuum attachment system adaptable to a wide variety of scroll saw designs.

SUMMARY OF THE INVENTION

The present invention is an aftermarket-type removably attachable saw dust collection system that can easily fit a variety of scroll saw designs.

More particularly, the present invention is a vacuum attachment assembly for a scroll saw wherein the scroll saw includes a base, a table, a table bevel lock, an upper arm and a lower arm-blade. The vacuum attachment includes a bracket having first and second ends. The first end of the bracket has an opening for receiving the table bevel lock knob. The second end of the bracket has an opening of predetermined size and is oriented so that the opening is located under the scroll saw table near the lower arm-blade assembly. The vacuum attachment assembly also includes an elbow that is connected to the opening of the second end of the bracket. Finally, a hose is connected to the elbow and oriented to collect and divert saw dust away from the table of the scroll saw.

DESCRIPTION OF ILLUSTRATIVE EMBODIMENTS

Figure 1A:
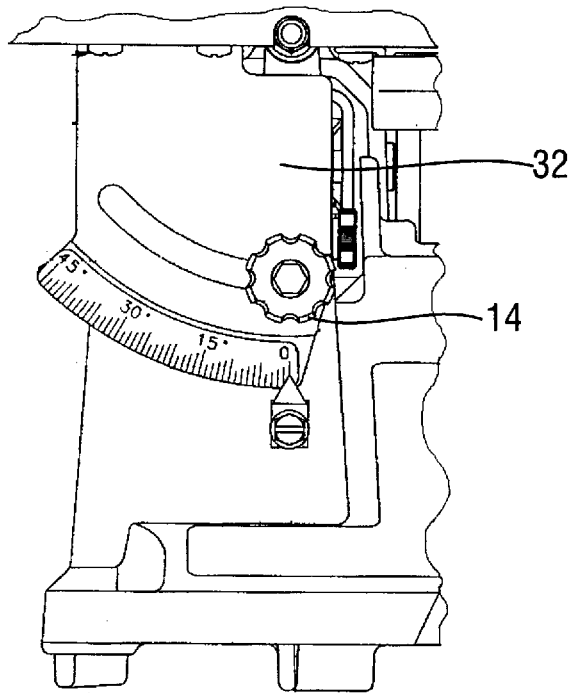
FIG. 1A is a partial cut-away front view of a typical scroll saw having a table lock bevel knob.
Figure 1B:
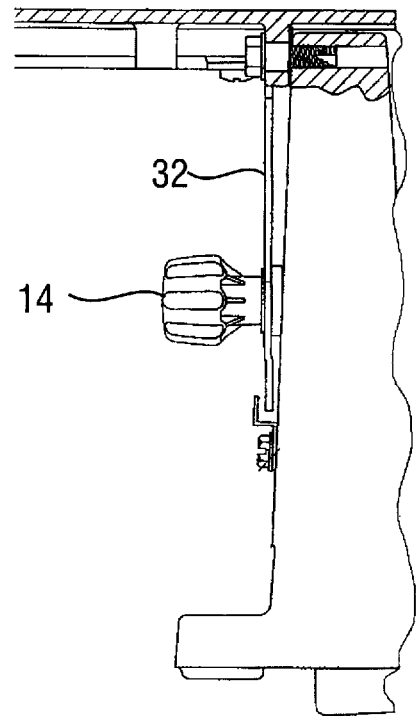
FIG. 1B is a partial cut-away side view of a typical scroll saw having a table lock bevel knob.
Figure 1C:
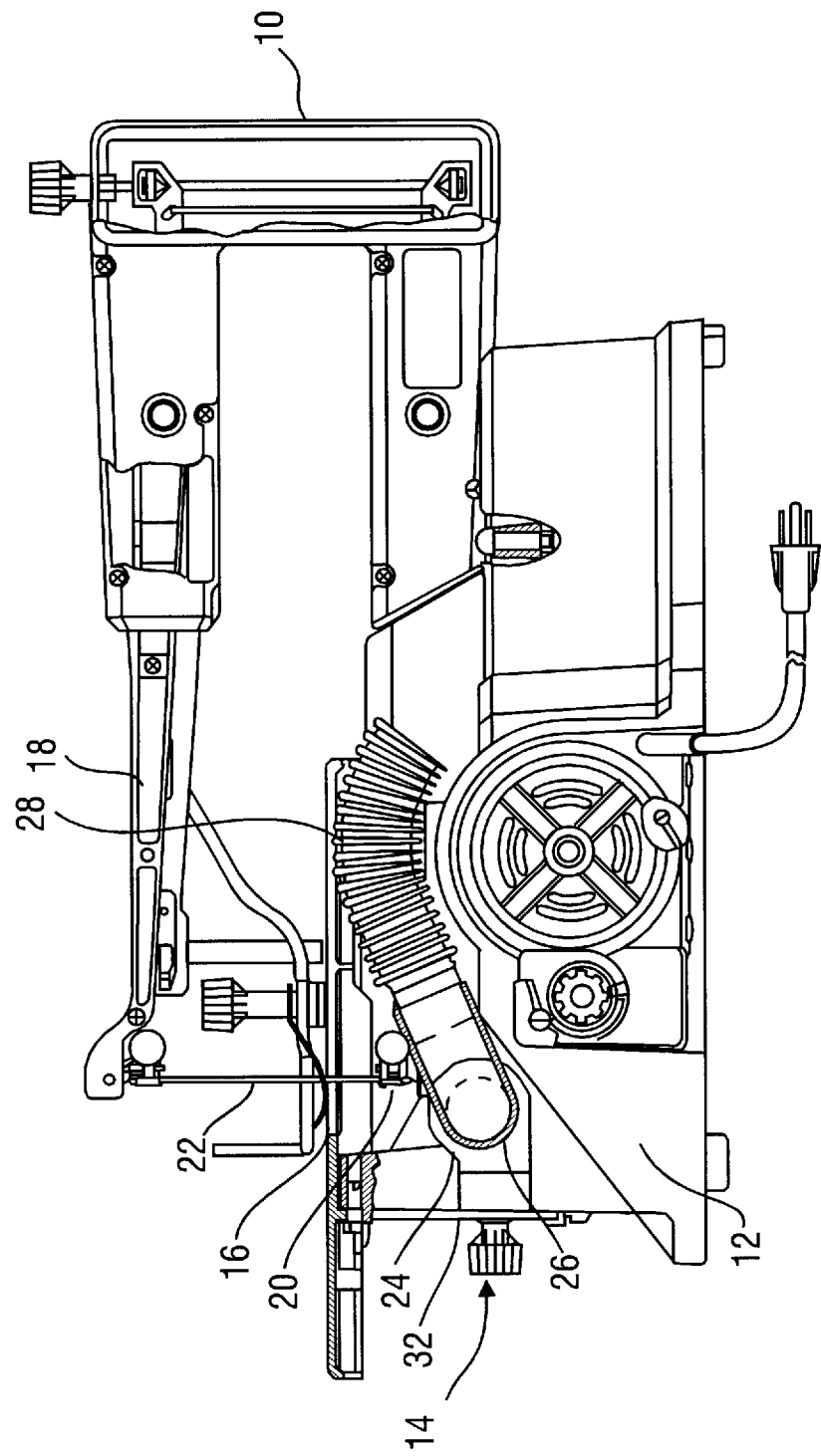
FIG. 1C is side view of a typical scroll saw incorporating a preferred embodiment of the invention.

FIGS. 1A, 1B and 1C show a typical scroll saw design for which the present invention can be implemented. FIG. 1C shows a preferred embodiment of the present invention incorporated on a typical commercial scroll saw generally indicated at 10. The typical scroll saw includes a base 12, a table bevel lock knob 14, a table 16, a table bevel plate 32 and upper arm assembly 18, a lower arm assembly 20 and a blade 22.

Figure 3:
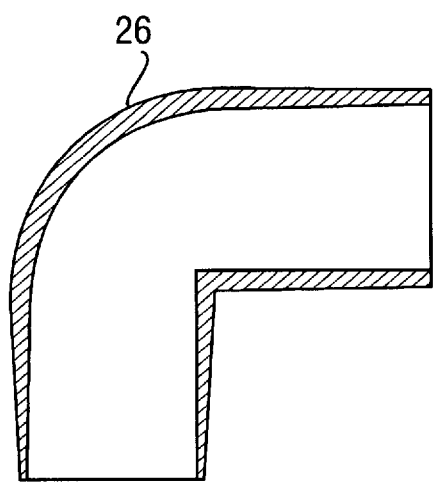
FIG. 3 is a top cross-sectional view of the preferred embodiment of the elbow of FIG. 2 of the present invention.
Figure 4:
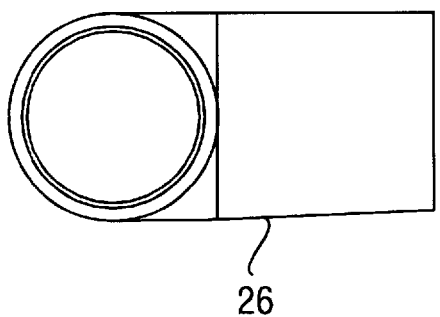
FIG. 4 is a side view of the elbow of FIG. 3.
Figure 5:
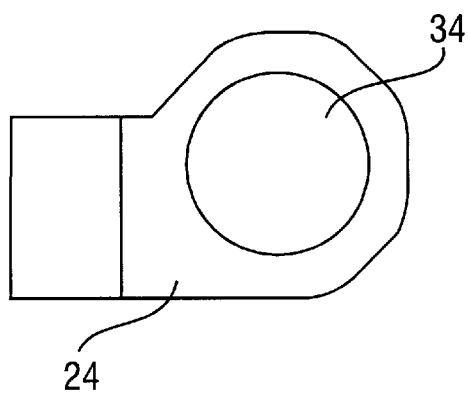
FIG. 5 is a side view of the preferred embodiment of the bracket of FIG. 2.

The vacuum attachment assembly of the present invention is principally comprised of three components. The first component is bracket 24 which has a first and second end and is preferably constructed of a single piece of sheet metal. However, bracket 24 can be constructed of many types of material, such as plastic. Still referring to FIG. 1C, the second component of the preferred embodiment of the present invention is elbow 26, which attaches to an opening in bracket 24. Elbow 26 can take many different shapes and can be constructed from a variety of materials. However, elbow 26 is preferably constructed from a soft rubber material and molded into a generally right-angle shape as shown in FIGS. 3 and 4. The third component of the preferred embodiment of the present invention is hose 28 which is of a typical vacuum hose construction.

Figure 2:
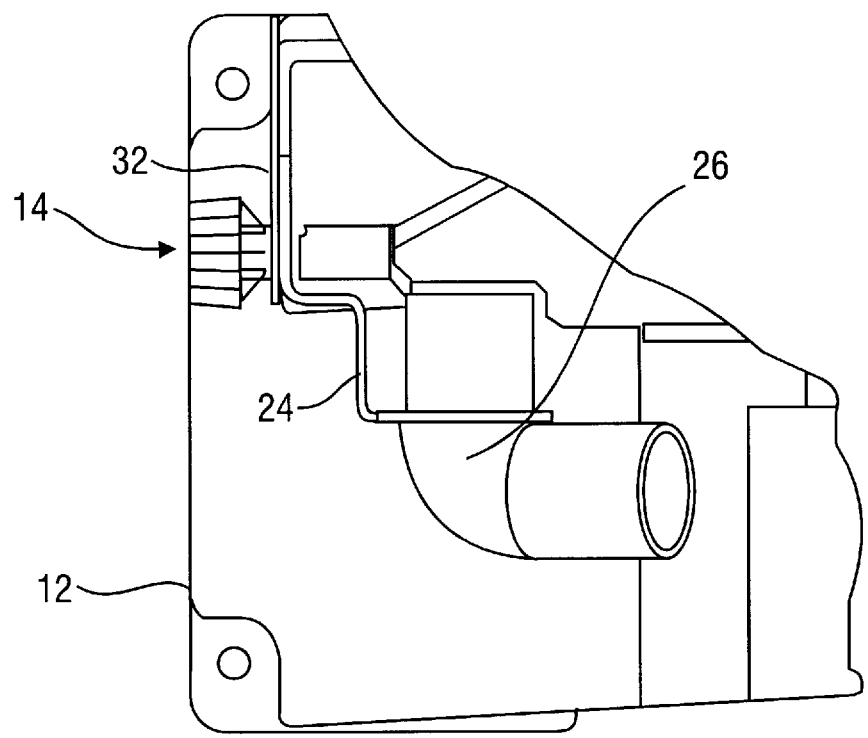
FIG. 2 is a partial top view of the preferred embodiment of the bracket and elbow of FIG. 1 attached to the base of a typical scroll saw.
Figure 7:
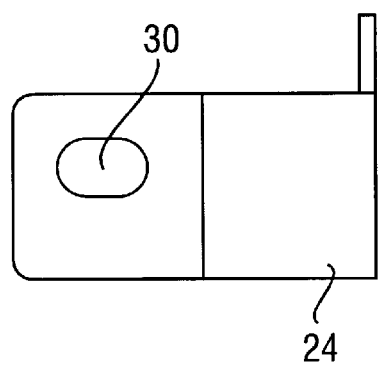
FIG. 7 is a front view of the bracket of FIG. 5.
Figure 8A:
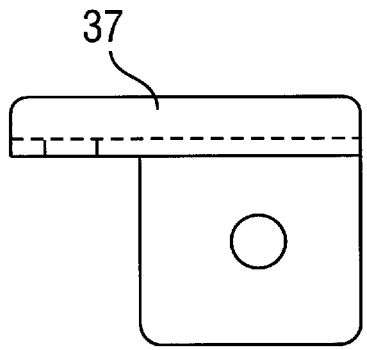
FIG. 8 is a bracket adapter for the bracket of FIG. 5.
Figure 8B:
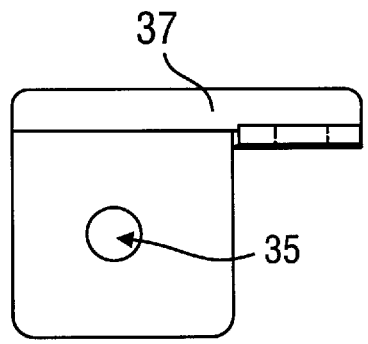
Figure 8C:
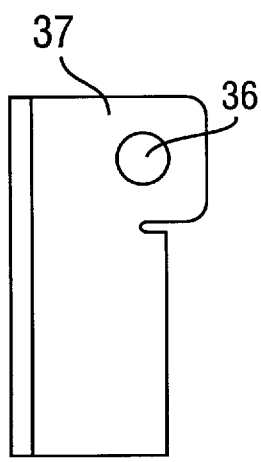
Figure 8D:
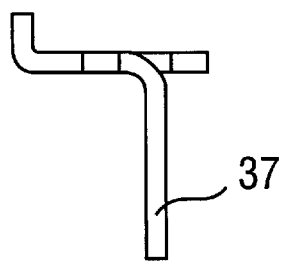

The vacuum attachment assembly of the present invention is not integrated into the design of a particular scroll saw. Rather, it is adapted to be easily used on a wide variety of scroll saws. The afternarket-type connection of the present invention to a typical scroll saw is shown in FIG. 2. The partial top view of FIG. 2 shows bracket 24 attached to base 12 of typical scroll saw 10 by table bevel lock knob 14. More particularly, table bevel lock knob 14 extends through an opening 30 of bracket 24 (shown in detail in FIG. 7). Table bevel lock knob 14 also extends through table bevel plate 32, which when turned, tightens the table and secures bracket 24 into place.

As shown in FIGS. 8A–8D, the present invention includes a bracket adapter 37, which, through opening 35, can be fastened to bracket 24 through opening 30 (FIG. 7) to allow extension and adaptability of the bracket to a variety of saws. Table bevel lock knob 14 extends through opening 36 of bracket adapter 37 in a similar manner as opening 30 in bracket 24 as previously described.

Figure 6:
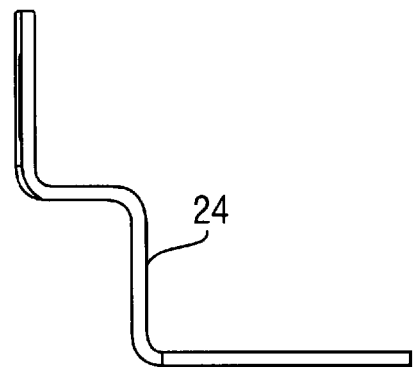
FIG. 6 is a top view of the bracket of FIG. 5.

As shown in FIG. 6, bracket 24 is preferably shaped in a double-S configuration. However, it will be appreciated by those with skill in the art that the bracket can be formed in various shapes and sizes. Preferably, bracket 24 includes a second opening 34 which is configured to receive an end of elbow 26. Although opening 34 can be of various configurations, it is preferably circular in shape. In any event, it is typically configured in the same cross-sectional shape as elbow 26 and hose 28.

Opening 34 and elbow 26 are typically configured in size and shape so that elbow 26 connects inside opening 34 by way of a press-fit connection, although a variety of other types of connections could be made. Elbow 26 is typically of a molded plastic right angle construction. However, it can be shaped in a variety of configurations and constructed from a variety of materials.

Opening 34 of bracket 24 is preferably located under table 16 near lower arm assembly 20 of scroll saw 10. The movement created by the reciprocating action of the saw blade during operation causes sawdust to fall through an opening in the table, which is collected and diverted away from the table by hose 28.

Hose 28 is of a typical vacuum hose construction. Typically, hose 28 press-fits into elbow 26. However, elbow 26 may be eliminated and hose 28 can be attached directly to opening 34 of bracket 24. In any event, hose 28 diverts the collected sawdust away from the table so as to prevent the buildup of sawdust under the table during operation of the scroll saw.

It will be apparent to those skilled in the art that the foregoing described vacuum attachment is easily adaptable to a wide variety of scroll saws. That is, rather than being designed and integrally manufactured into the base of a scroll saw, the present invention simply attaches to the table bevel lock knob of a standard scroll saw unit. It will be appreciated by those of skill of art that the present invention can also be attached to a scroll saw by a simple bolt-type connection.

What is claimed is:

1. A vacuum attachment assembly for a scroll saw wherein scroll saw includes a base, a table supported by the base, a table bevel lock knob received by the base, and a lower arm assembly coupled to the base, said vacuum attachment comprising:

a bracket, said bracket having a first end and a second end, said first end of said bracket adapted to be removably mounted to said base of said saw, said second end of said bracket having an opening of predetermined size;

an elbow, said elbow removably connected to said opening of said bracket, said opening of said bracket located under said table of said saw near said lower arm assembly of said saw; and a hose removably connected to said elbow to direct dust away from said table of said saw.

2. The vacuum attachment assembly of claim 1 wherein said first end of said bracket further includes an opening of a predetermined size to receive said table bevel lock knob.

3. A vacuum attachment assembly for a saw wherein said saw includes a base, a table supported by the base, a table bevel lock knob received by the base, and a lower arm coupled to the base, said vacuum attachment comprising:

a bracket, said bracket having a first end and a second end, said first end having an opening to receive said table bevel lock knob so as to removably couple said bracket to said base, said second end having an opening of predetermined size; and a hose removably connected to said opening of said second end of said bracket, said second end of said bracket configured such that, when said bracket is coupled to said base, said hose is located under said table of said saw near said lower arm, said hose oriented to direct dust away from said table of said saw.

4. A vacuum attachment assembly for a scroll saw wherein said scroll saw includes a base, a table supported by the base, a table bevel lock knob received by the base, and a lower arm-blade, said vacuum attachment comprising:

a bracket, said bracket having a first end and a second end, said first end of said bracket having an opening adapted to receive said table bevel lock knob so as to removably connect said bracket to said base, said second end of said bracket having an opening of predetermined size and being oriented so that said opening of said second end is located under said table near said lower arm-blade;

an elbow, said elbow removably connected to said opening of second end of said bracket in a press-fit relationship; and a hose removably connected to said elbow and oriented to direct dust away from said table of said saw.

5. A vacuum attachment assembly for a scroll saw wherein said scroll saw includes a base, a table supported by the base, a table level lock knob received by the base, and a lower arm-blade, said vacuum attachment comprising:

a bracket, said bracket having a first end and a second end, said first end of said bracket having an opening to receive said table level lock knob so as to removably connect said bracket to said base, said second end of said bracket having an opening of predetermined size and oriented so that said opening of said second end of bracket is located under said table near said lower arm-blade; and a hose removably connected to said opening of said second end of said bracket in a press-fit relationship, said hose oriented to direct dust away from said table of said saw.

6. The vacuum attachment assembly of claim 1 wherein said elbow forms a right angle.

7. A vacuum attachment assembly for a saw wherein said saw includes a base, a table, a table bevel lock knob, a table bevel plate, an upper arm and a lower arm, said vacuum attachment comprising:

a bracket, said bracket having a first end and a second end, said first end having an opening to receive said table bevel lock knob, said second end having an opening of predetermined size, said first end of said bracket removably connected to said base of said saw; and a hose removably connected to said opening of said second end of said bracket, said second end of said bracket located under said table of said saw near said lower arm, said hose oriented to direct dust away from said table of said saw.

8. The vacuum attachment assembly of claim 7 wherein said hose is press-fit connected to said bracket.

9. A vacuum attachment assembly for a scroll saw wherein said scroll saw includes a base, a table, a table bevel lock knob, a table bevel plate, an upper arm and a lower armblade, said vacuum attachment comprising:

a bracket, said bracket having a first end and a second end, said first end of said bracket having an opening to receive said table bevel lock knob, said second end of said bracket having an opening of predetermined size, said bracket removably connected to base of scroll saw at said first end by said table bevel lock knob and oriented so that said opening of said second end located under said table near said lower arm-blade;

an elbow, said elbow removably connected to said opening of second end of said bracket in a press-fit relationship; and a hose removably connected to said elbow and oriented to direct dust away from said table of said saw.

10. The vacuum attachment assembly of claim 9 wherein said elbow is molded from one of a rubber or plastic material to form a right angle.

11. A vacuum attachment assembly for a scroll saw wherein said scroll saw includes a base, a table, a table level lock knob, a table bevel plate, an upper arm and a lower armblade, said vacuum attachment comprising:

a bracket, said bracket having a first end and a second end, said first end of said bracket having an opening to receive said table level lock knob, said second end of said bracket having an opening of predetermined size, said bracket removably connected to base of said scroll saw at said first end by said table bevel lock knob and oriented so that said opening of said second end of bracket is located under said table near said lower arm-blade; and a hose removably connected to said opening of said second end of said bracket in a press-fit relationship, said hose oriented to direct dust away from said table of said saw.

12. The vacuum attachment assembly of claim 1, further comprising an adapter adapted to be fastened to said first end of said bracket, said adapter including an opening of a predetermined size to receive said table bevel lock knob.

\* \* \* \* \*

UNITED STATES PATENT AND TRADEMARK OFFICE
CERTIFICATE OF CORRECTION

PATENT NO. : 5,884,544
DATED : March 23, 1999
INVENTOR(S) : John L. Theising, et. al.

It is certified that error appears in the above-identified patent and that said Letters Patent is hereby corrected as shown below:

In column 4, line 17, after the word "table," delete "level" and insert --bevel-- therefor.

In column 4, line 67, after the second word "table," delete "level" and insert --bevel-- therefor.

In column 5, line 5, after the word "table," delete "level" and insert --bevel-- therefor.

Signed and Sealed this

Twenty-fourth Day of August, 1999

Attest:

Q. TODD DICKINSON

*Attesting Officer*     *Acting Commissioner of Patents and Trademarks*